UNITED STATES PATENT OFFICE.

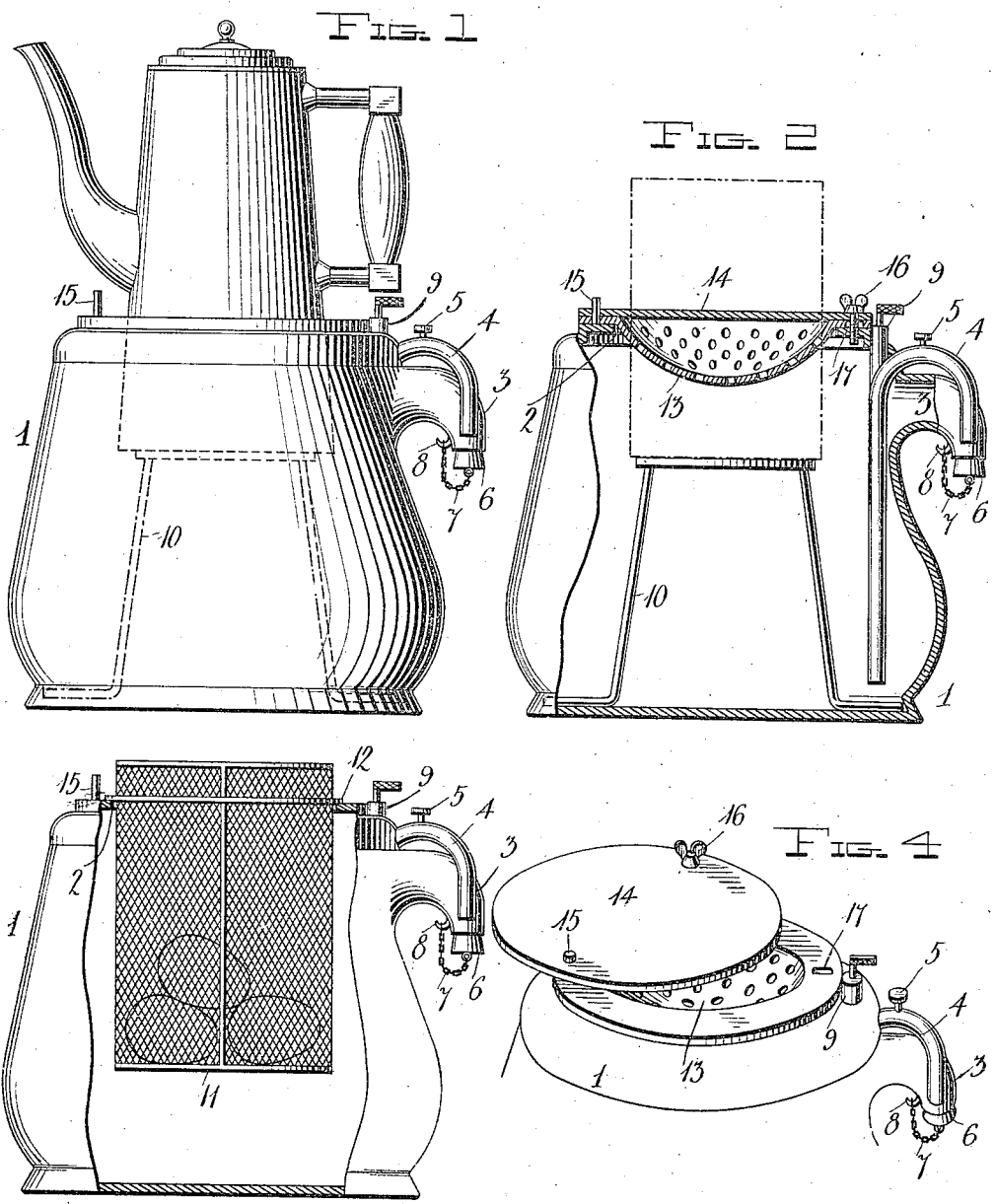

ARCHIBALD G. REDWOOD, OF HOUSTON, TEXAS.

KETTLE.

No. 843,698.         Specification of Letters Patent.         Patented Feb. 12, 1907.

Application filed November 6, 1905. Serial No. 286,103.

*To all whom it may concern:*

Be it known that I, ARCHIBALD G. REDWOOD, a citizen of the United States, residing at Houston, in the county of Harris and State of Texas, have invented certain new and useful Improvements in Kettles; and I do declare the following to be a full, clear, and exact description of the invention, such as will enable others skilled in the art to which it appertains to make and use the same.

My invention is an improved kettle adapted to be used for the ordinary purposes of a kettle and also adapted for use in keeping coffee, eggs, or other articles of food warm; and it consists in the combination and arrangement of devices hereinafter described and claimed.

In the accompanying drawings, Figure 1 is a side elevation, partly in section, of my improved kettle, showing a coffee-pot therein to be kept warm thereby. Fig. 2 is a similar view showing the kettle employed to heat a can of beans or other food. Fig. 3 is a similar view showing an egg-boiler in the kettle. Fig. 4 is a perspective view showing the upper portion of the kettle and the cover thereof.

The kettle 1 may be made of any suitable material and may be of the form here shown or of any other suitable form. Its mouth 2 is of sufficient diameter to enable a coffee-pot or other vessel to be placed in the kettle. The spout 3 of the kettle is curved, and partly embedded in the same is the spout of a flow-pipe 4, which I will call a "siphon," the longer end of which siphon extends downwardly in the kettle to near the bottom thereof and is open at its lower end. The siphon has a valve provided with a button 5, said valve being normally closed and when opened by pressure on the button serving to permit the flow of hot water from the kettle through the siphon when it is desired to obtain a small quantity of hot water from the kettle without tilting or lifting the kettle to pour water from its spout 3 or without removing the coffee-pot or other article which may be in the kettle. Said spout of the kettle is provided with a stopper 6, which is removable therefrom at will and is connected to the kettle by a suitable chain 7, which is attached to a hook 8, provided on the kettle-spout.

In connection with the siphon I employ a pump 9 to force air up through the siphon, and hence cause water to flow through the siphon.

In the bottom of the kettle is placed a stool 10, the legs of which are elastic to facilitate the placing of the stool in the kettle and its removal therefrom. The stool extends to within about five inches of the top of the kettle and serves to support a copper pot or other vessel, which it may be desired to heat or keep hot. It will be understood that the stool serves to support the bottom of the coffee-pot or other vessel at some distance above the bottom of the kettle, so that hot water will be between the bottom of the kettle and the bottom of the coffee-pot or other vessel to prevent the coffee or other material within the inner vessel from being burned.

It will be understood that a can of beans or other food may be placed in the kettle, as shown in Fig. 2, to heat the same. In Fig. 3 I show an egg-boiler 11 in the kettle, the egg-boiler being a cylindrical frame made of wire and covered with wire-gauze or other foraminous material. The egg-boiler has a flange 12 near its upper end, by which it is hung within the kettle, thus rendering it unnecessary to employ the stool to support the egg-boiler.

The kettle is provided with an inner lid or cover 13 and an outer lid or cover 14, both of which are pivoted thereon by the same pivot pin or stud 15. The inner lid or cover is concavo-convex in cross-section with its concave side uppermost and is perforated, so that it is adapted to hold eggs or other articles which may be placed thereon, the perforations enabling steam to pass therethrough for the purpose of heating such eggs or other articles. The outer cover or lid 14 may be placed directly over the perforated cover 13 and is flat to enable a dish, plate, or other article to be placed thereon to be heated and kept hot by the steam from the kettle. The outer lid has a thumb-screw 16 on one side, and the inner lid has a slot 17 in one side to receive said thumb-screw, the latter being employed to secure the lids together for simultaneous movement to open or close the kettle when desired.

I employ the stopper in the spout of the kettle in order to cause air to come through the siphon, and thus cause water to flow through the siphon when desired. A button or valve may be employed at the base of the kettle-spout instead of the stopper to secure the same result, if desired. Such button will be covered with asbestos.

Having thus described my invention, what I claim as new, and desire to secure by Letters Patent, is—

A kettle having an opening in its top, an inturned flange extending around said opening, and a pivot-pin projecting up from one side of said flange, an inner cover for the kettle, having a flat flange to bear on that of the kettle, mounted on the pivot-pin, having a perforated, depressed concavo-convex central portion extending downwardly into the kettle and forming a receptacle, a flat outer cover, on the inner cover and mounted independently thereof on the pivot-pin, said flange, and inner and outer covers having openings which register when said covers are closed, and a locking-pin for insertion in said openings, substantially as described.

In testimony whereof I have hereunto set my hand in presence of two subscribing witnesses.

ARCHIE G. REDWOOD.

Witnesses:
PHILIP BELLEGGIE,
W. B. OCHILTREE.